United States Patent
Schenk et al.

(10) Patent No.: US 8,942,570 B2
(45) Date of Patent: *Jan. 27, 2015

(54) DATA DETECTION FOR VISIBLE LIGHT COMMUNICATIONS USING CONVENTIONAL CAMERA SENSOR

(75) Inventors: Tim Corneel Wilhelmus Schenk, Eindhoven (NL); Frederik Jan De Bruijn, Eindhoven (NL); Ruud Vlutters, Eindhoven (NL); Lorenzo Feri, Eindhoven (NL)

(73) Assignee: Koninklijke Phillips N.V., Eindhoven (NL)

( * ) Notice: Subject to any disclaimer, the term of this patent is extended or adjusted under 35 U.S.C. 154(b) by 221 days.

This patent is subject to a terminal disclaimer.

(21) Appl. No.: 13/520,589

(22) PCT Filed: Jan. 13, 2011

(86) PCT No.: PCT/IB2011/050151
§ 371 (c)(1),
(2), (4) Date: Jul. 5, 2012

(87) PCT Pub. No.: WO2011/086517
PCT Pub. Date: Jul. 21, 2011

(65) Prior Publication Data
US 2012/0281987 A1    Nov. 8, 2012

(30) Foreign Application Priority Data

Jan. 15, 2010 (EP) .................................. 10150854

(51) Int. Cl.
*H04B 10/00* (2013.01)
*H05B 37/02* (2006.01)

(52) U.S. Cl.
CPC .......... *H05B 37/0272* (2013.01); *H05B 37/029* (2013.01)

USPC ........... 398/172; 398/118; 398/127; 398/130; 382/312

(58) Field of Classification Search
USPC .......................................... 398/172, 118–131
See application file for complete search history.

(56) References Cited

U.S. PATENT DOCUMENTS

| | | | |
|---|---|---|---|
| 2010/0271476 A1* | 10/2010 | Damink et al. | 348/135 |
| 2011/0043116 A1* | 2/2011 | Schenk et al. | 315/152 |
| 2012/0281879 A1* | 11/2012 | Vlutters et al. | 382/103 |

FOREIGN PATENT DOCUMENTS

| | | | |
|---|---|---|---|
| WO | 2009010926 A2 | 1/2009 | |
| WO | 2009136309 A2 | 11/2009 | |
| WO | 2009136312 A1 | 11/2009 | |
| WO | WO2009136309 | * 11/2009 | |

* cited by examiner

*Primary Examiner* — Li Liu
(74) *Attorney, Agent, or Firm* — Meenakshy Chakravorty

(57) ABSTRACT

The invention relates to a detection system for determining data embedded into the light output of a light source in a form of a repeating sequence of N symbols. The detection system includes a camera and a processing unit. The camera is configured to acquire a series of images of the scene via specific open/closure patterns of the shutter. The processing unit is configured to process the acquired series of images to determine the repeating sequence of N symbols. By carefully triggering when a shutter of the camera is open to capture the different symbols of the encoded light within each frame time of a camera, a conventional camera with a relatively long frame time may be employed. Therefore, the techniques presented herein are suitable for detecting the invisible "high frequency" coded light while using less expensive cameras as those used in the prior art.

16 Claims, 12 Drawing Sheets

DATA DETECTION FOR VISIBLE LIGHT COMMUNICATIONS USING CONVENTIONAL CAMERA SENSOR

FIELD OF THE INVENTION

Embodiments of the present invention relate generally to the field of illumination systems and optical receivers, and, more specifically, to systems and methods for detecting data embedded into the light output of such illumination systems.

DESCRIPTION OF THE RELATED ART

Visible light communications refers to communicating data via the light output produced by lighting sources. Such communications is a promising way of enabling localized wireless data exchange in the future because a wide unlicensed frequency band is available for this and because light emitting diodes (LEDs) used to illuminate a room or a space can be applied to provide the communications. Possibly every lighting source of the future could become a communications source.

One visible light communications technique is based on embedding data into the light output of an illumination device by modulating the light output of the illumination device in response to a repeating data signal (such light output is sometimes referred to as "coded light" and abbreviated as "CL"). Preferably, the light output is modulated at a high frequency so that the modulation is invisible to the consumers.

One scenario where CL can be applied includes lamps embedding data in their light output concerning their maintenance information such as burning hours, dimming schemes, capabilities, control network address, lamp temperature, dimming schedules, failures, etc. Another scenario includes lamps in public places embedding data that provides local weather, directions, local commercials for nearby shops/restaurant, traffic information, music, etc.

The embedded data may be detected by an optical receiver which may, for example, be implemented in a remote control for controlling the lamp or included in another unit such as a switch or a sensor device. One known technique for detecting CL includes pointing an optical receiver to a particular lamp and reading out the data embedded in the light output of the lamp.

One drawback of this detection technique is that only embedded data present at a single position can be detected. In contrast, it is desirable to retrieve the data communicated at different positions within a scene at the same time. To that end, other detection techniques have been shown to employ a camera by pointing the camera to a scene and processing and recording data streams of the various positions within the scene in parallel. This type of camera-based detection requires a camera with a frame rate that is at least equal to the modulation frequency used to embed data into a light output of a lamp. Conventional commercial cameras, such as the ones used e.g. in mobile phones and webcams, have frame rates of 50 to 100 Hz, which is far below the modulation frequencies necessary for embedding data in a manner that is invisible to the consumers. While these cameras can be used to detect CL, the CL has to be embedded either by using a low modulation frequency or by using color modulation. Both of these embedding methods result in variations in the light output of a lamp that is noticeable to consumers.

As the foregoing illustrates, what is needed in the art is a technique for detecting data embedded into a light output of light sources that addresses at least some of the problems described above.

SUMMARY OF THE INVENTION

It is an object of the invention to provide a detection system and a method suitable for determining data embedded into the light output of a light source with the invisible "high frequency" modulation while using conventional commercial cameras as those used in the previous techniques.

One embodiment of the present invention sets forth a detection system for determining a repeating first sequence of N symbols included in a first code. The first code is embedded into a light output of a first light source of an illumination system. The detection system includes at least a camera and a processing unit. The camera is configured to acquire a series of images of a scene. Each acquired image includes a plurality of pixels, each pixel representing an intensity of a total light output of the illumination system at a different physical position within the scene. The total light output of the illumination system includes the light output of the first light source in at least one physical position within the scene. The series of images includes at least N different images. Each image of the at least N different images is acquired with a total exposure time comprising one or more exposure instances at different temporal positions within the repeating first sequence of N symbols. The processing unit is configured to process the acquired series of images to determine the repeating first sequence of N symbols.

Such a detection system may be implemented, for example, in a remote control for controlling the illumination system or included in another unit such as a switch, a sensor device, or a mobile phone. The processing unit may be implemented in hardware, in software, or as a hybrid solution having both hardware and software components.

Moreover, a corresponding method and a computer program for determining a repeating first sequence of N symbols included in a first code, where the first code is embedded into a light output of a first light source of an illumination system are provided. A computer program may, for example, be downloaded to the existing detection systems (e.g. to the existing optical receivers or mobile phones) or be stored upon manufacturing of the detection systems.

As used herein, the term "pixel" [of an image] refers to a unit of image data corresponding to a particular point within a scene. Image data comprises intensities (or derivatives thereof) of the total light output of the illumination system at different points within the scene. Arranging image data in rows and columns of pixels is one way of representing the three-dimensional (3D) scene in a 2D image.

The time duration of a repeating sequence of the embedded code (or, alternatively, the length of the repeating sequence of the embedded code measured in the number of binary values comprising the sequence) is referred to herein as a "code period." A particular code may be embedded into the light output of a light source by modulating the drive signal applied to the light source via binary modulation or multilevel modulation using e.g. pulse width modulation, pulse density modulation, or amplitude modulation, as known in the art. As used herein, the term "drive signal" refers to an electrical signal that, when applied to a light source, causes the light source to generate light output. Preferably, the code is embedded in the light output in such a manner that a human eye cannot distinguish between a light output that includes the embedded code and a light output that does not. This may be achieved by e.g. modulating the drive signal applied to the first light source at a high frequency.

The present invention is based on recognizing that by capturing a series of images of the same scene that differ only in the relative times when each image is acquired within the repeating sequence (such times are referred to herein as "exposure instances") and selecting the temporal positions and the durations of the exposure instances within the frame time of the camera to be corresponding to particular code bits of the encoded light, a particular sequence of code bits embedded into the light output of a light source may be determined (the light output of that light source being present within the scene). The sum of the durations of all exposure instances within a frame is referred to as the "exposure time" of the camera. The desired exposure time at particular exposure instances may be implemented by opening and closing a shutter of the camera, where the shutter can be either internal of external to the camera. The exposure time remains the same for all of the images while varying when the shutter is open with respect to the embedded sequence of code bits (i.e., while varying the temporal positions of the exposure instances within the repeating sequence). For example, for a frame time of a camera set to 20 milliseconds (ms) and an exposure time set to 5 ms, one image may be acquired when the shutter is open only for the first 5 ms of the frame (i.e., the shutter is closed for the last 15 ms of the frame), another image may be acquired when the shutter is only open for the last 5 ms of the frame (i.e., the shutter is closed for the first 15 ms of the frame), yet another image may be acquired when the shutter is open for the first millisecond of the frame, then closed for a millisecond, then open another millisecond, then closed again for a millisecond, then open again for 3 ms, and then closed for the remainder of the frame time. A processing unit may be configured to compare selected pixels of the acquired series of images with thresholds that differentiate one code bit from another to determine all of the code bits of the encoded sequence.

Acquiring and processing a series of images in this manner allows determining data embedded into a light contribution of a light source within a 2D scene. By carefully triggering when the shutter of the camera is open to capture the different code bits of the encoded light within each frame time of a camera, a conventional camera with a relatively long frame time may be employed. Therefore, the techniques presented herein are suitable for detecting the invisible "high frequency" CL while using less expensive cameras as those used in the prior art.

The light sources described herein may comprise high/low pressure gas discharge sources, inorganic/organic light emitting diodes, laser diodes, incandescent sources, or halogen sources. Data embedded in the light output of the illumination system may comprise localized identification of the light sources, their capabilities and current settings, or other types of information related to the light sources. However, it should be noted that the illumination system is not necessarily applied for the purpose of illuminating a space or area but may also be applied for data communication as such. As an example, the illumination system may constitute an access point to a network. For such applications, at least part of the light output produced by the illumination system may lie outside of the visible spectrum (i.e., the light output of one of the light sources of the system may lie outside of the visible spectrum).

The embodiment of claims 2 and 13 specify that the processing of the acquired series of images may advantageously comprise determining a type of modulation used to embed the first code into the light output of the first light source, using the determined type of modulation to determine one or more thresholds differentiating different symbols of the first code, and determining the repeating first sequence of N symbols by comparing each pixel of a sequence of pixels of the acquired series of images corresponding to the at least one physical position within the scene that comprises the light output of the first light source with at least one of the one or more determined thresholds.

The embodiment of claim 3 provides that the sequence of pixels used for determining the repeating first sequence of N symbols comprises pixels corresponding to the physical position within the scene that includes only the light output of the first light source. In this manner, the sequence of pixels that include only a single data stream embedded into the light output of a single light source is used for determining the symbols.

The embodiment of claim 4 provides for the inclusion of an intermediate sequence within the first code. The intermediate sequence may be advantageously used e.g. for providing synchronization between the repeating first sequence of N symbols and the receiver (claim 5), determination that the repeating first sequence of N symbols comprises pixels corresponding to the physical position within the scene that includes only the light output of the first light source (claim 5), and/or determination of the type of modulation used to embed the repeating first sequence into the light output of the first light source (claim 6).

The embodiment of claim 7 sets forth the duration of an exposure instance. Selecting such duration is advantageous because it allows the processing unit to resolve the individual symbols of the embedded code.

Embodiments of claims 8 and 9 provide that, when the one or more exposure instances comprise at least two exposure instances, the exposure instances may be consecutive (i.e., a single exposure) or non-consecutive (i.e., an exposure within a frame of the camera is broken up into separate exposure instances). When all exposure instances within a frame of a camera are consecutive, a shutter that is typically internal to all cameras may be used to set the correct exposure instances within the total exposure time (i.e., to set the exposure instances at the desired temporal positions within the frame time of the camera). Alternatively, the shutter that is typically internal to all cameras may be set to be open for the entire frame time of each frame, and a shutter that is external to the camera may be used to set the correct exposure instances within the total exposure time. An electronic shutter may be used for this purpose.

The embodiments of claims 10 and 14 allow correction for the multiple-bit exposure(s) per frame of a camera when the one or more exposure instances comprise two or more exposure instances. Acquiring each image with multiple-bit exposures per frame may be more light efficient, especially in low light conditions, by reducing the impact of noise on the detection process.

The embodiment of claim 11 advantageously specifies employing a camera with a frame rate lower than the frequency of modulation used to embed the first code into the light output of the first light source for acquiring the series of images.

Hereinafter, an embodiment of the invention will be described in further detail. It should be appreciated, however, that this embodiment may not be construed as limiting the scope of protection for the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
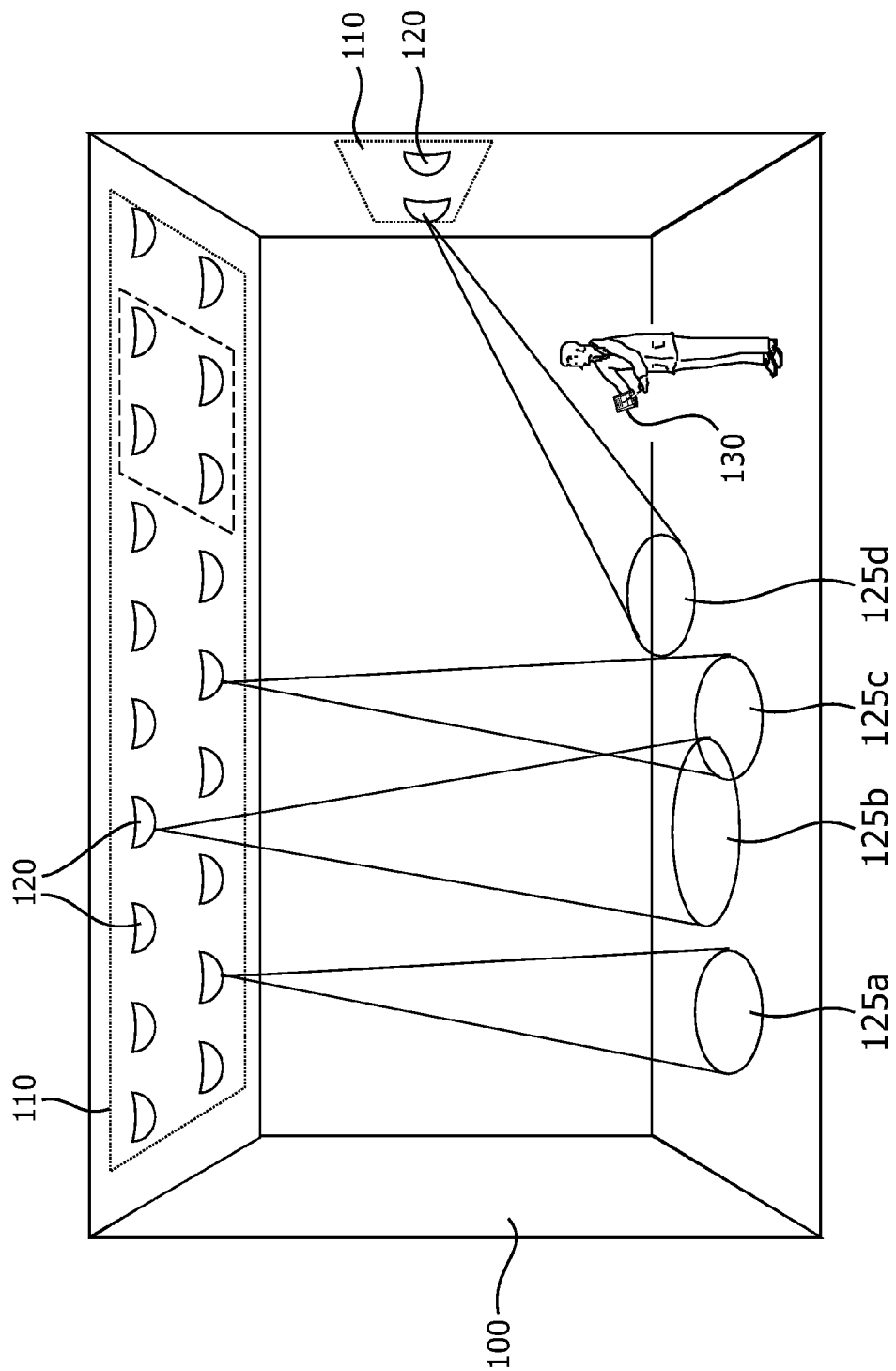
FIG. 1 is a schematic illustration of an illumination system installed in a structure according to one embodiment of the present invention.

FIG. 1 shows a structure 100—in this case a room—with an installed illumination system 110. The illumination system 110 comprises one or more of light sources 120 and one or more controllers (not shown in FIG. 1) controlling the light sources 120. When driven with an electrical signal, the light sources 120 illuminate parts of the structure 100, the illumination contributions from the various light sources 120 shown as footprints 125a-125d. The light sources 120 may comprise high/low pressure gas discharge sources, inorganic/organic light emitting diodes, laser diodes, incandescent sources, or halogen sources. The illumination system 110 may further comprise a remote control 130 allowing a user to control the light sources 120.

Figure 2:
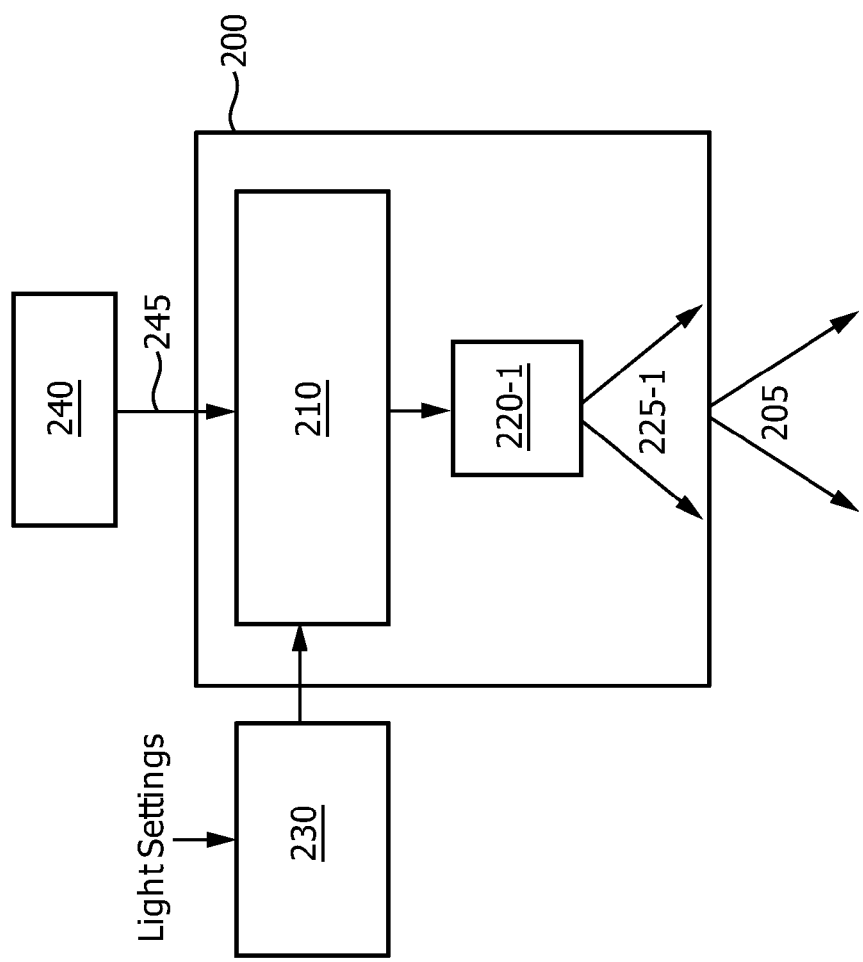
FIG. 2 is a schematic illustration of an illumination system according to one embodiment of the present invention.

FIG. 2 is a schematic illustration of an illumination system 200 according to one embodiment of the present invention. The illumination system 200 may be used as the illumination system 110 in the structure 100 illustrated in FIG. 1. As shown, the illumination system 200 includes at least a system controller 210 and a first light source 220-1, and is configured to generate a light output 205 according to light settings. In other embodiments, the illumination system may include additional light sources and, optionally, additional controllers, individually controlling each of the additional light sources. Alternatively, a single controller may be configured to control multiple light sources.

The illumination system 200 is configured to operate as follows. As shown in FIG. 2, the light settings for the illumination system 200 are provided to a drive signal generator 230 (which, optionally, may be included within the illumination system 200). The light settings indicate what the average light output 205 should be in terms, for example, of light power, e.g. defined in lumen, and color. The light settings may be provided by a user via the remote control 130 or may be preprogrammed and provided from an external unit controlling the scene setting. Alternatively, the light settings may be preprogrammed and stored in a memory within the drive signal generator 230 or within the illumination system 200. The drive signal generator 230 translates the light settings into different electrical drive signals for different light sources within the illumination system 200 and provides the drive signals to the system controller 210. In the embodiment illustrated in FIG. 2, the drive signal generator 230 translates the light settings into a first drive signal for the first light source 220-1. The system controller 210, in turn, drives the different light sources with their respective drive signals to produce the light output 205. In the embodiment illustrated in FIG. 2, the system controller 210 is configured to drive the light source 220-1 with a first drive signal to produce a light output 225-1. In this embodiment, the light output 205 of the illumination system 200 comprises the light output 225-1.

As described, the light settings indicate what the light output 205 of the illumination system 200 should be in terms, for example, of light color. The color change of the light output 205 may be achieved by differently dimming the different light sources (additional, optional, light sources not shown in FIG. 2) within the illumination system 200 via controlling the drive signals provided to the system controller 210 from the drive signal generator 230. For a constant dimming level per light source, the drive signal that is provided from the drive signal generator 230 to the system controller 210 comprises a repeated pattern of pulses. Such a repeated pattern is referred to herein as a "drive pattern."

Various methods for dimming the light sources are known to people skilled in the art and, therefore, are not described here in detail. These methods include e.g. pulse width modulation, pulse density modulation, or amplitude modulation.

Figure 3:
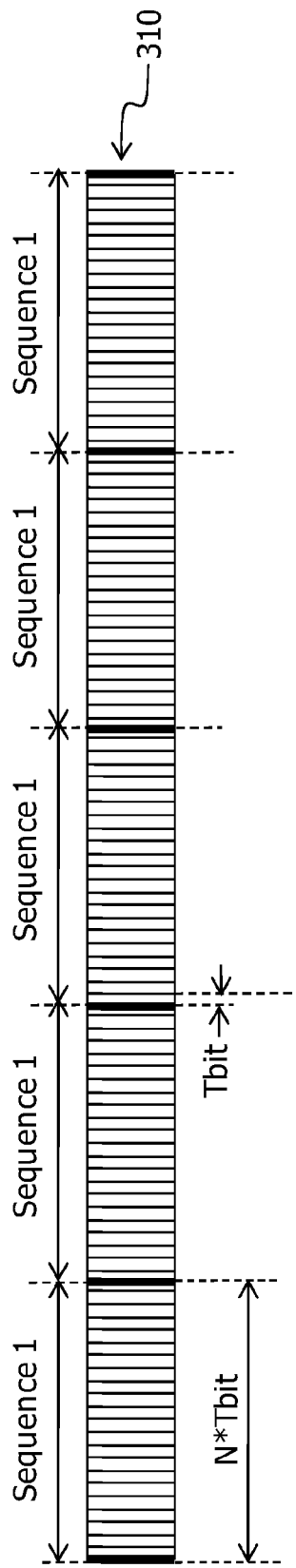
FIG. 3 is a schematic illustration of a code comprising a repeating sequence of N symbols, according to one embodiment of the present invention.

The system controller 210 is further configured to receive a signal 245 from a data source 240. The signal 245 includes (at least) data bits to be embedded into the light output 225-1 of the light source 220-1. The system controller 210 is configured to generate a code to be embedded into the light output 225-1 by arranging the data bits in repeating sequences. One example of such a code is illustrated in FIG. 3. As shown, code 310 comprises a first repeating sequence of N symbols (e.g., bits), shown as "Sequence 1." In the following description, the symbols will be referred to as bits. However, it should be recognized that whenever the word "bit" is used in the present application, a wider definition of a "symbol" applies which may also comprise multiple bits represented by a single symbol. One example are multi-level symbols, where not only 0 and 1 exist to embed data, but multiple discrete levels.

Each bit of the code 310 has duration $T_{bit}$. Thus, the code period is equal to $N*T_{bit}$. The sequence may represent, for example, a localized identification of the light source 220-1, its capabilities and current light settings, or other type of information that may or may not be related to the light source 220-1 or the illumination system 200.

In one embodiment, the "Sequence 1" may comprise all of the data bits to be embedded into the light output 225-1. In another embodiment, the system controller 210 may divide the data bits to be embedded into sets of smaller length (i.e., packets). In such an embodiment, a first code to be embedded into the light output 225-1 would include a repeating sequence of one set (e.g., repeating first packet), a next code would include a repeating sequence of another set (e.g., a repeating second packet), and so on.

Optionally, the data bits to be embedded into the light output 225-1 may be encoded using channel coding (e.g., using convolution or block coding) or using a cyclic redundancy check (CRC) code. This may be done to increase redundancy in the transmitted data sequences in order to correct for errors in bit detection and/or to verify whether the detected data is valid. Alternatively this coding might be used to shape the spectrum of the transmitted light signal to e.g. decrease the visibility of the data embedded into the light output 225-1. For the latter approach, in one embodiment, Manchester encoding may be employed. The advantage of this encoding method is that it suppresses the low frequency components in the light signals, which are the ones causing visible flicker.

In one embodiment, the code 310 may comprise an intermediate sequence inserted between at least some of the occurrences of the "Sequence 1" (not shown in FIG. 3). For example, an intermediate sequence may be included between each occurrence of the "Sequence 1." In an embodiment where the data bits are divided into packets, such an intermediate sequence may be analogous to a header of a packet containing information related to the packet such as e.g. type of modulation and/or encoding used on the transmitting side, and/or identification of the light source 220-1. Alternatively, an intermediate sequence may be included after each two or three of the occurrences of "Sequence 1." Yet in another embodiment, an intermediate sequence may be included in an occasional, non-periodical manner.

As explained below, the intermediate sequence may be used by a processing unit of a detection system to derive synchronization between the light source 220-1 and the detection system and/or to provide additional information to the processing unit that allows the processing unit to determine the code bits of the first sequence of N bits.

The system controller 210 can embed the code 310 into the light output 225-1 of the light source 220-1 by modulating the drive signal to be applied to the light source 220-1 in response to the code 310. Various techniques for embedding a code into the light output of a light source are known to people skilled in the art and, therefore, are not described here in detail. The signal 245 may further include other similar codes to be embedded into the light output of the other light sources. Each of the codes includes a different repeating sequence of N bits.

Figure 4:
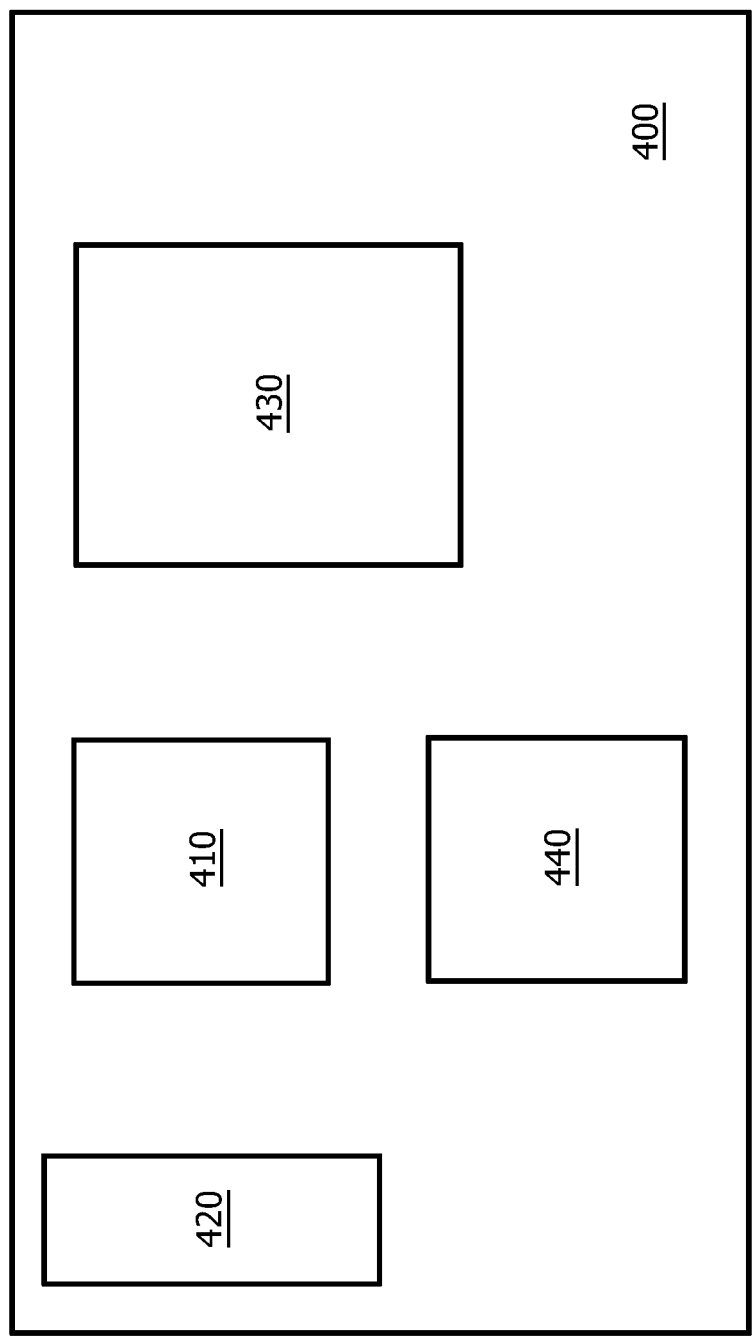
FIG. 4 is a schematic illustration of a detection system, according to one embodiment of the present invention.

FIG. 4 is a schematic illustration of a detection system 400, according to one embodiment of the present invention. As shown, the detection system 400 includes at least a camera 410, a shutter 420, and a processing unit 430. Optionally, the detection system 400 also includes a memory 440. The camera 410 is configured to acquire a series of images of a scene. The shutter 420 is configured to carefully time the instances when images are acquired by the camera 410 (images are acquired when the shutter 420 is open and images are not acquired when the shutter 420 is closed). In various embodiments, the shutter 420 may either comprise a conventional shutter internal to the camera 410 which can only open and close a single time during a frame time of the camera (i.e., a single exposure of a predetermined duration within a frame) or an electronic shutter disposed in front of the camera which can open and close multiple times during a single frame.

Scenario 1: Single-Bit Exposure Per Frame

First, consider an exemplary scenario where the illumination system 200 is such that two light sources can provide light contribution to a particular scene. Consider that the scene is a part of the floor of the structure 100, illustrated in FIG. 1, the first light source is the one of the light sources 120 illustrated in FIG. 1 having the footprint 125b within the scene (i.e., on the floor), and the second light source is the one of the light sources 120 illustrated in FIG. 1 having the footprint 125c within the scene. The respective codes embedded into the light outputs of the first and second light sources include different repeating sequences of N bits.

Figure 5:
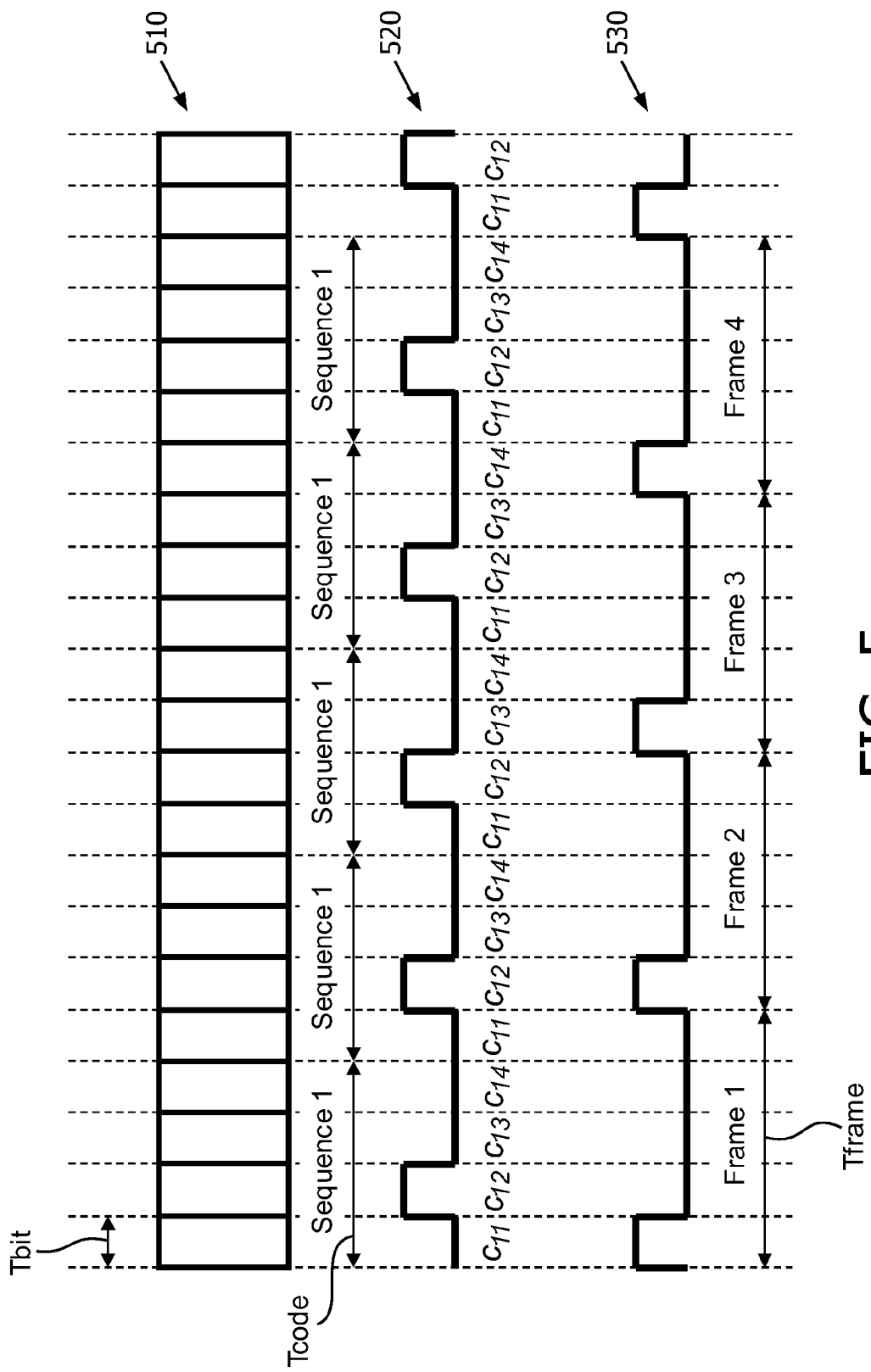
FIG. 5 provides schematic illustrations of an exemplary code comprising a repeating sequence of 4 symbols and exemplary single-bit exposure instances within the frames of the camera appropriate for such code, according to one embodiment of the present invention.

For simplicity, consider that data to be embedded into the light output of the first light source includes only 4 bits. A code comprising a repeating sequence of these 4 bits is shown in FIG. 5 as a code 510 (i.e., the first repeating sequence of N bits comprises a sequence of 4 bits). As shown, each of the bits has duration $T_{bit}$. Therefore, the code period is equal to $4*T_{bit}$. Further, consider that the individual bits of the sequence, bits $c_{11}$, $c_{12}$, $c_{13}$, $c_{14}$, comprise 0, 1, 0, and 0, respectively, illustrated in FIG. 5 with a signal 520. The signal 520 may be included in the signal 245, described in FIG. 2.

As described above, data is embedded into the light output of the first light source by driving the first light source with a drive signal modulated in response to the code 510. In various embodiments, the system controller 210 may generate the modulated drive signal by modulating the drive signal via binary or multilevel modulation using e.g. pulse width modulation (PWM), pulse position modulation, pulse density modulation, or amplitude modulation. For example, to embed a binary value of 0 from the signal 520 using PWM, the system controller 210 may make a drive pattern within the drive signal narrower by an amount a to embed a binary value of "0" from the signal 520 and the system controller 210 may make another drive pattern within the drive signal wider by an amount b to embed a binary value of "1" from the signal 520. By making the ratio between the amount a and the amount b equal to the ratio between the number of 1's and 0's in the signal 520, embedding data in the light output of the illumination system may be made invisible for the human eye because the time average of the modulated drive signal remains the same as that of the original drive signal. Persons skilled in the art will recognize other methods for modulating the drive signal in dependence of the signal 520 to embed data into light output of the illumination system.

Similarly, consider that data embedded into the light output of the second light source includes 4 bits, $c_{21}$, $c_{22}$, $c_{23}$, $c_{24}$. Again, each of the bits has duration $T_{bit}$ and the code period is, therefore, equal to $4*T_{bit}$. The above discussion regarding how the bits of data may be embedded into the light output of the second light source is applicable and, therefore, in the interests of brevity, is not repeated.

The detection system 400 may be configured to operate in the following manner in order to determine the bits of data embedded into the light output of the first light source.

First, the camera 410 is configured to acquire a series of images of the scene, where the scene is selected to be such that at least part of the scene includes the light output of the first light source. To that end, the frame time of the camera may be set to be one bit greater than the code period, i.e. $5*T_{bit}$, and the exposure of the camera may be set to comprise a single exposure instance having duration equal to the duration of one bit of the code period, i.e. $T_{bit}$. Further, the camera 410 may be configured to acquire an image during the first time period $T_{bit}$ of each frame. The exposure of the camera 410 configured in this manner is illustrated in FIG. 5 with a line 530.

When an image is taken, the camera acquires intensities of the total light output of the illumination system at all of the positions within a scene. In the present application, whenever the term "intensity" (of the light output) is used, it is understood that a "derivative of the intensity" is included as well, such as e.g. the light color, color temperature, light spectrum, and change in light intensity. The image is commonly divided into a plurality of pixels, where each pixel represents an intensity of the total light output of the illumination system at a different physical position within the scene. In the current scenario, the total light output of the illumination system comprises the light contribution from the first light source and the light contribution from the second light source.

Figure 6A:
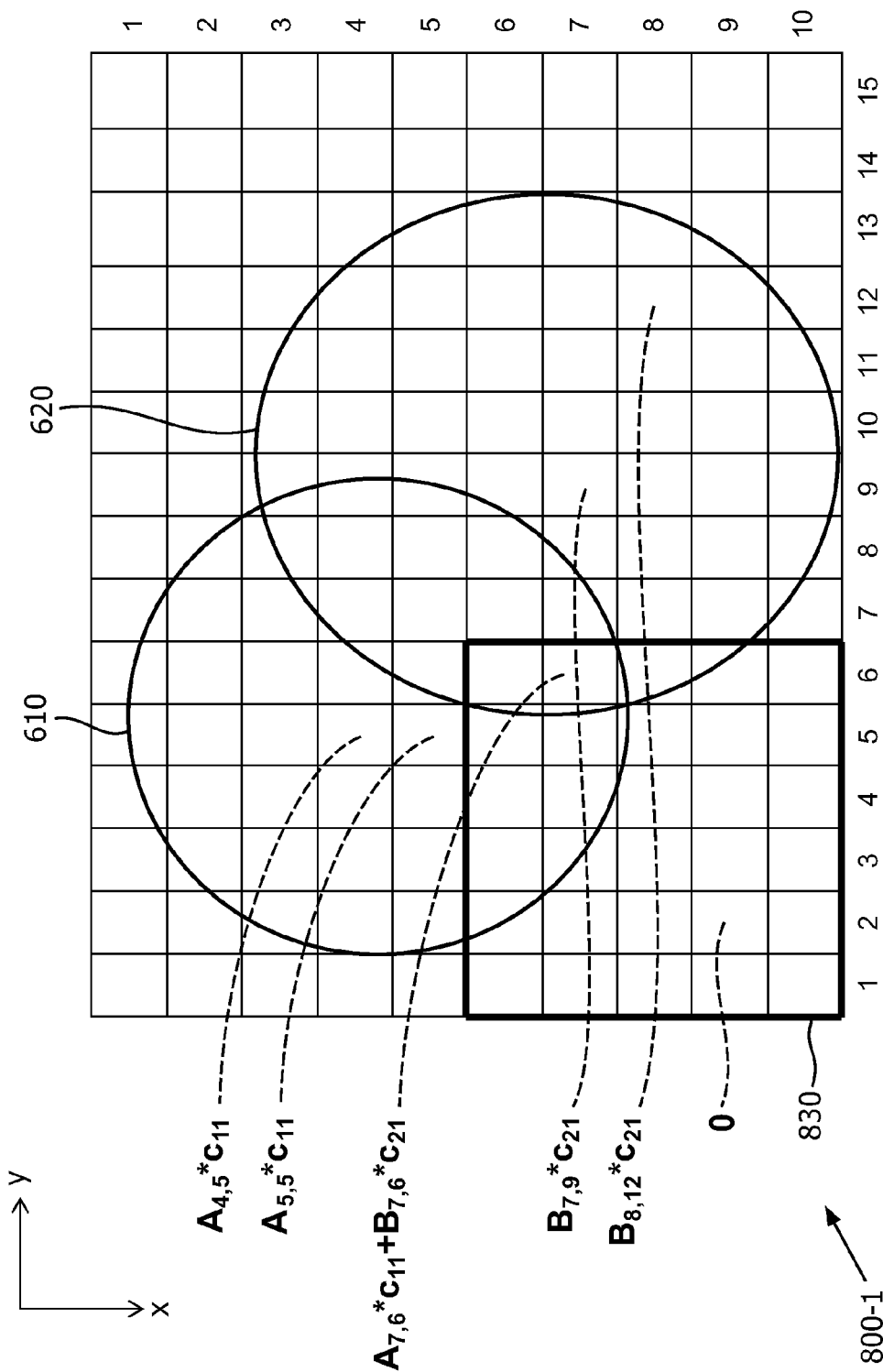
FIG. 6a is a schematic illustration of a first image of the series of images taken when two light sources provide light contributions to a scene, according to one embodiment of the present invention.

Consider that each image is divided into 2D grid of 150 pixels, with 10 pixels in the x-direction and 15 pixels in the y-direction. Because the exposure time of the camera 410 is set to be equal to a single code bit of the code, the intensity at a particular pixel of an image is affected by the value of the bit of the code encoded into the light output of the first light source and the value of the bit of the code encoded into the light output of the second light source at the time the image is taken. Such a first image is shown in FIG. 6*a* (this image corresponds to Frame 1 illustrated in FIG. 5). The footprint of the first light source within the scene is shown as a circle 610 and the footprint of the second light source is shown as a circle 620. Because the first image 600-1 is taken when the light output of the first light source is modulated with the code bit $c_{11}$ and the light output of the second light source is modulated with the code bit $c_{21}$, the intensity $I_{x,y}$ at each pixel (x,y) may be calculated as follows:

$$I_{x,y}=A_{x,y} \cdot c_{11}+B_{x,y} \cdot c_{21},$$

where $A_{x,y}$ and $B_{x,y}$ are respective values of what the intensities of the light output of the first and second light sources would be if the drive signals applied to the first and second light sources were not modulated with the particular code bit. Thus, as shown in FIG. 6*a*, the intensity at e.g. a pixel (7,6) is equal to $(A_{7,6} \cdot c_{11}+B_{7,6} \cdot c_{21})$. Further, as shown in FIG. 6*a*, the intensity at e.g. a pixel (4,5) is equal to $A_{4,5} \cdot c_{11}$ and the intensity at a pixel (5,5) is equal to $A_{5,5} \cdot C_{11}$ because the second light source does not provide any light contribution to the parts of the scene represented by these pixels (these pixels are outside of the footprint 620), i.e. $B_{4,5}=B_{5,5}=0$. Similarly, the intensity at e.g. a pixel (7,9) is equal to $B_{7,9} \cdot c_{21}$ and the intensity at a pixel (8,12) is equal to $B_{8,12} \cdot c_{21}$ because the first light source does not provide any light contribution to the parts of the scene represented by these pixels (these pixels are outside of the footprint 610), i.e. $B_{7,9}=B_{8,12}=0$. The intensity at e.g. pixel (9,2) is shown to be equal to zero because neither the first nor the second light sources provide any light contribution to the part of the scene represented by this pixel (this pixel is outside of the footprint 610 and 620).

Figure 6B:
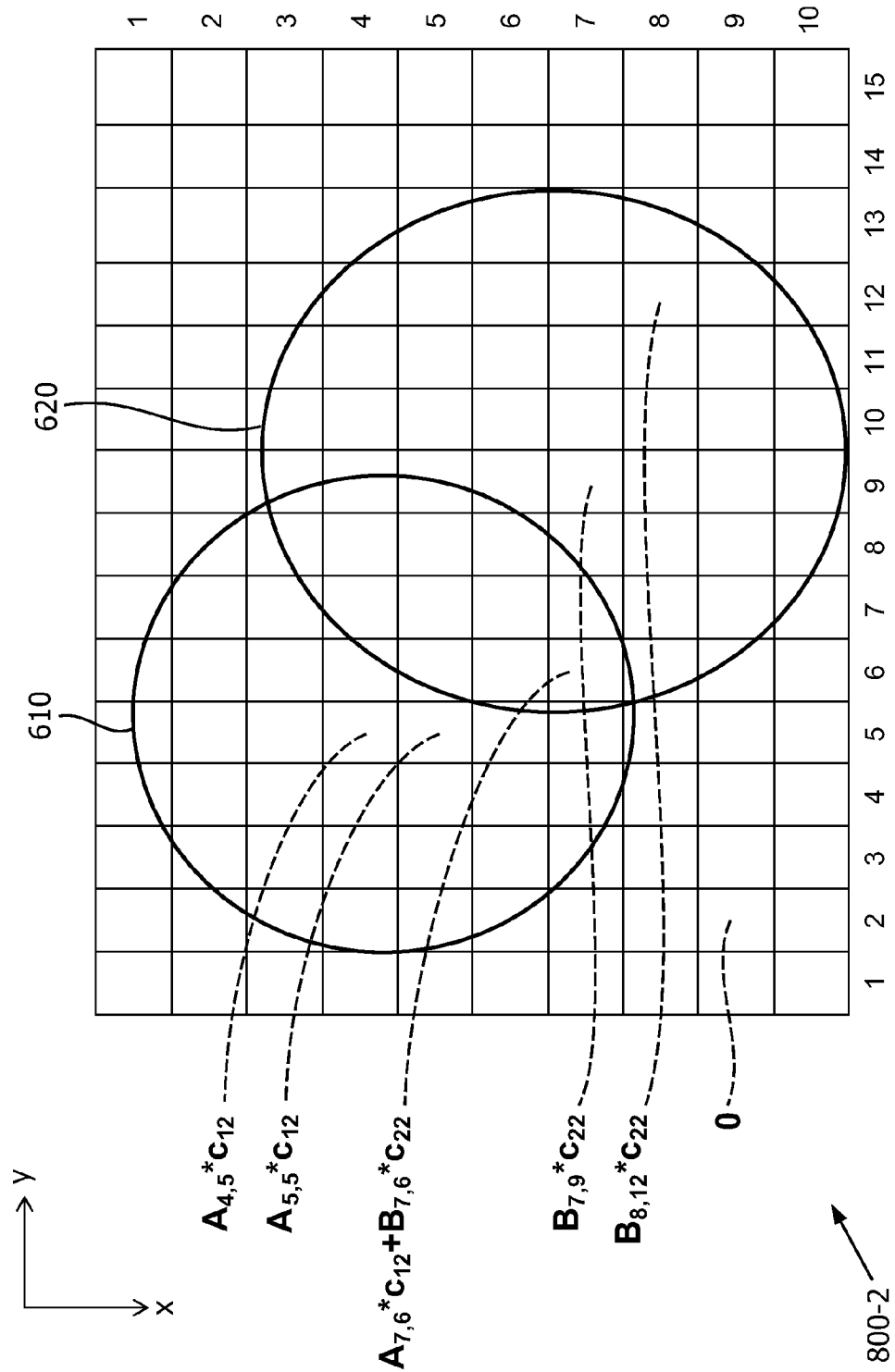
FIG. 6b is a schematic illustration of a second image of the series of images taken when two light sources provide light contributions to a scene, according to one embodiment of the present invention.

As seen from the exposure 530, the second image of the series of images of the scene is acquired during Frame 2 of the camera 410. The second image is shown in FIG. 6*b* as an image 600-2. Since the image is taken of the same scene, the footprints 610 and 620 remain the same as in the first image. Because the image 600-2 is taken when the light output of the first light source is modulated with the code bit $c_{12}$ and the light output of the second light source is modulated with the code bit $c_{22}$, the intensity at each pixel (x,y) may be calculated as follows:

$$I_{x,y}=A_{x,y} \cdot c_{12}+B_{x,y} \cdot c_{22}.$$

Thus, as shown in FIG. 6*b*, the intensity at e.g. a pixel (7,6) is equal to $(A_{7,6} \cdot c_{12}+B_{7,6} \cdot c_{22})$. Further, as shown in FIG. 6*a*, the intensity at e.g. a pixel (4,5) is equal to $A_{4,5} \cdot c_{12}$, the intensity at a pixel (5,5) is equal to $A_{5,5} \cdot c_{12}$, the intensity at a pixel (7,9) is equal to $B_{7,9} \cdot c_{22}$, and the intensity at a pixel (8,12) is equal to $B_{8,12} \cdot c_{22}$. Again, the intensity at e.g. pixel (9,2) is shown to be equal to zero because neither the first nor the second light sources provide any light contribution to the part of the scene represented by this pixel.

Figure 6C:
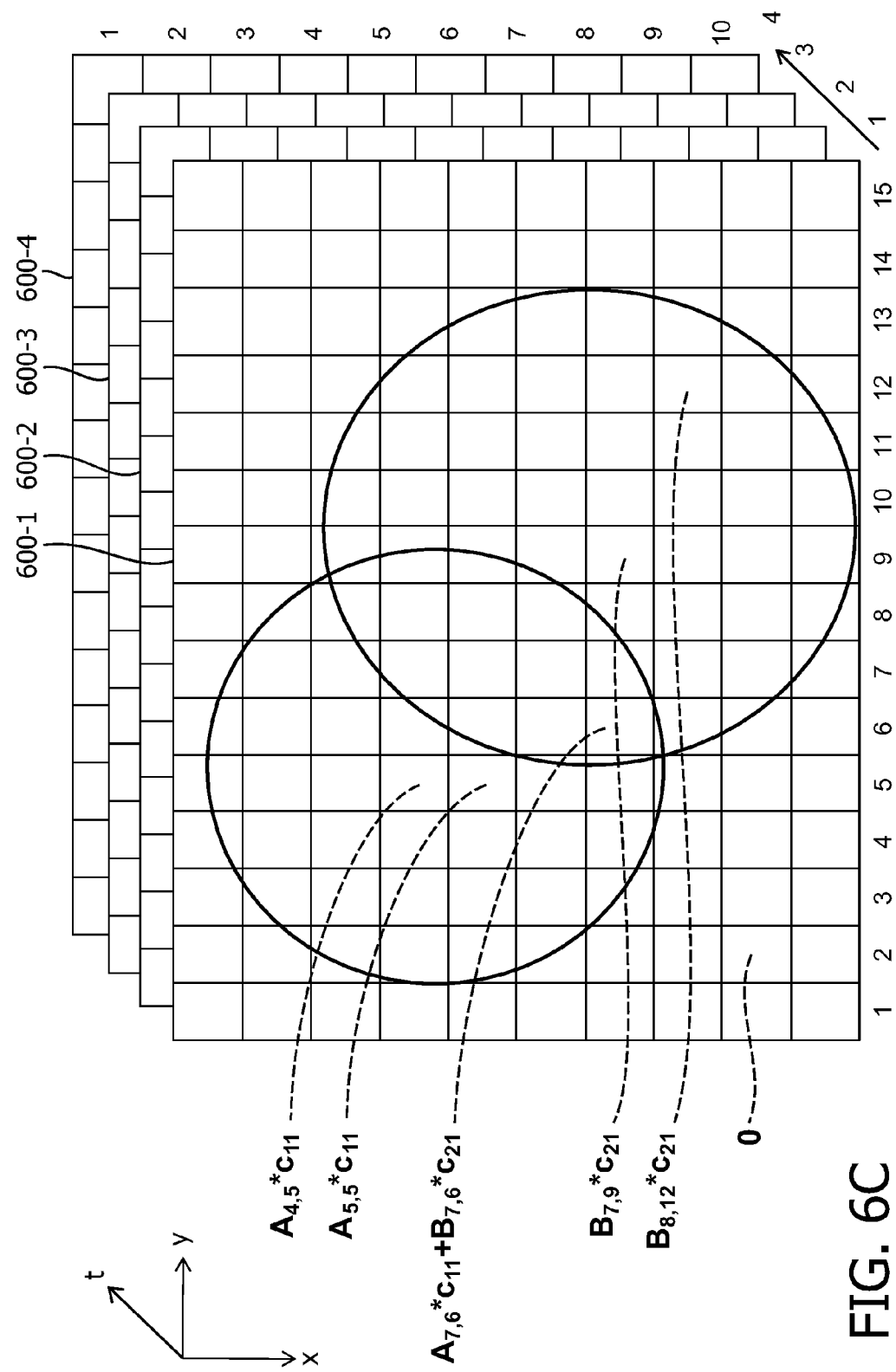
FIG. 6c is a schematic illustration of a series of images taken when two light sources provide light contributions to a scene, according to one embodiment of the present invention.

In the similar manner, in Frames 3 and 4, the camera 410 acquires, respectively, a third image (600-3) and a fourth image (600-4) of the series of images. Again, because of the way the exposure time and the frame time of the camera 410 is configured with respect to the embedded codes, the third image is taken when the light outputs of the first and second light sources are modulated with the code bits $c_{13}$ and $c_{23}$, respectively, and the fourth image is taken when the light outputs of the first and second light sources are modulated with the code bits $c_{14}$ and $c_{24}$, respectively. The series of images 600-1, 600-2, 600-3, and 600-4 are shown in FIG. 6*c*, where the different images are shown to extend in the t-direction (where "t" stands for "time"), representing that the images are taken of the same scene, but at different times.

Figure 7:
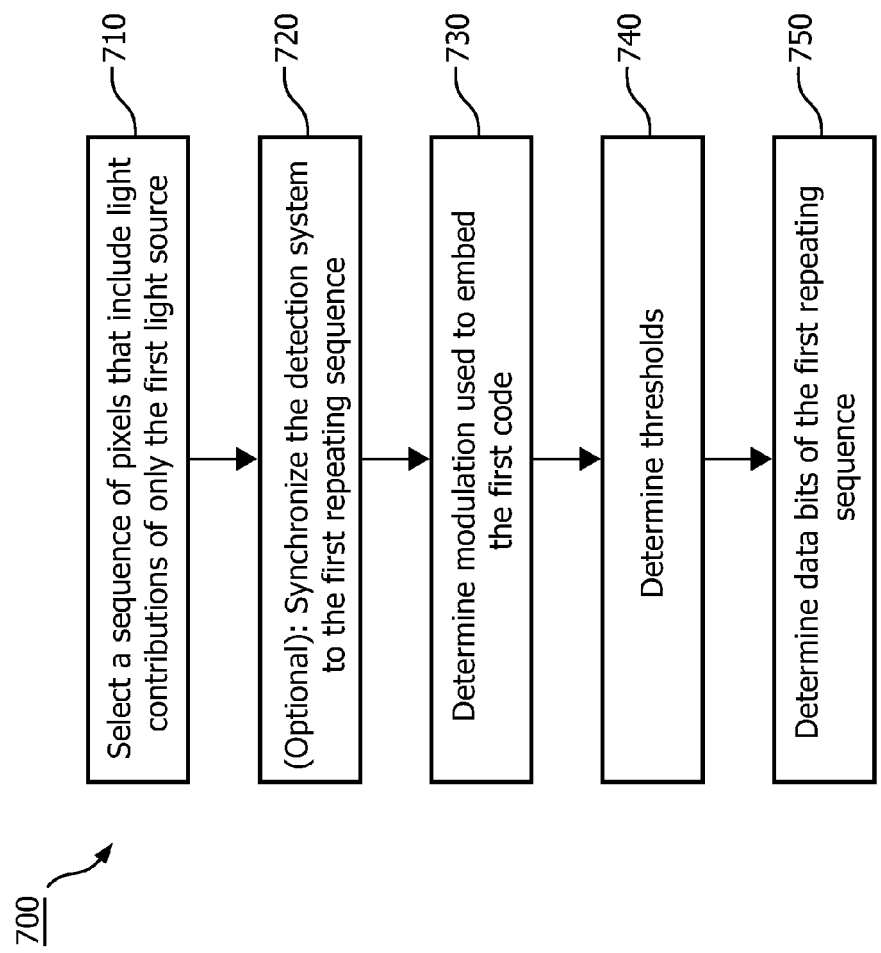
FIG. 7 is a flow diagram of method steps for determining the repeating sequence of N symbols, according to one embodiment of the present invention.

Having acquired the series of images 600-1 through 600-4, the processing unit 430 can process the series of images to determine the first repeating sequence of N bits embedded into the light output of the first light source. FIG. 7 illustrates a flow diagram of a method 700 for determining the first repeating sequence of N bits, according to one embodiment of the present invention. While the method steps are described in conjunction with FIG. 4, persons skilled in the art will recognize that any system configured to perform the method steps, in any order, is within the scope of the present invention.

The method 700 may begin with a step 710, where the processing unit 430 is configured to select a sequence of pixels within the series of images 600-1 through 600-4 corresponding to a physical position within the scene that includes only the light output of the first light source.

Figure 8:
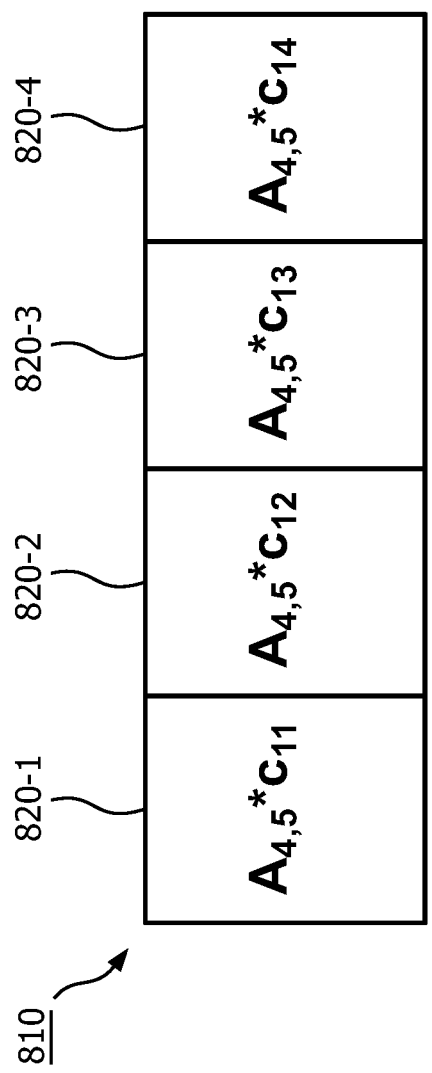
FIG. 8 is a schematic illustration of a sequence of pixels of the acquired series of images corresponding to one selected physical position within the scene comprising the light output of one the first light source, according to one embodiment of the present invention.

To illustrate a sequence of pixels within the series of images 600-1 through 600-4 corresponding to a particular physical position within the scene, consider that the selected physical position within the scene is the position corresponding to pixel (4,5) on the images 600-1 through 600-4. Then the sequence of pixels of the acquired series corresponding to that position comprises pixels (4,5) from each of the images. This sequence is shown as a sequence 810 in FIG. 8. The sequence 810 includes a pixel (4,5) from the first image 600-1 (shown as a pixel 820-1), a pixel (4,5) from the second image 600-2 (shown as a pixel 820-2), a pixel (4,5) from the third image 600-3 (shown as a pixel 820-3), and a pixel (4,5) from the fourth image 600-4 (shown as a pixel 820-4). As shown in FIG. 8, the intensities at the pixels 820-1 through 820-4 are equal to $A_{4,5} \cdot c_{11}, A_{4,5} \cdot c_{12}, A_{4,5} \cdot c_{13}$, and $A_{4,5} \cdot c_{14}$, respectively.

In one embodiment, the determination that a sequence of pixels corresponding to a particular physical position within the scene includes only the light output of a single (first) light source may be done in the following manner.

The system controller 210 may occasionally include one intermediate sequence into the code to be embedded into the light output of the first light source and include another intermediate sequence into the code to be embedded into the light output of the second light source, where the processing unit 430 has access to both of the intermediate sequences.

Each of the intermediate sequences may comprise some kind of identifier, such as e.g. an identifier of a particular light source. The number of different light sources that may be identified in this manner described above depends on the length of the intermediate sequence. For instance, for a synchronous Walsh-Hadamard code comprising a repeating sequence of M binary values, M different light sources may be identified, which means that the processing unit 430 can determine whether the light contribution of any one of the M different light sources is present at a particular position within a scene and, optionally, determine the magnitude of such a light contribution. Using a conventional 50 Hz camera (i.e. the camera can take 50 images per second) configured to have a single bit-long exposure instance at each frame, a series of images necessary for resolving a 50-bit intermediate sequence of the embedded code may be acquired in 1 second.

In one embodiment, the illumination system 200 may directly provide the intermediate sequences to the processing unit 430. In another embodiment, the detection system 400 may include the memory 440 storing the intermediate sequences. In yet another embodiment, the detection system 400 may be configured to obtain the intermediate sequences from the (wirelessly) received light signals. Alternatively, the processing unit 430 may obtain, by any of the means described above, not the intermediate sequences contained in each of the embedded codes themselves, but derivatives thereof (i.e., parameters from which the intermediate sequences may be obtained). For example, the processing unit 430 may obtain the length of a particular known sequence or an indicator number referring to one out of the set of possible sequences. The intermediate sequences may then be recreated by the processing unit 430, potentially reducing the amount of communication provided to the detection system 400. In another embodiment, the parameters describing the intermediate sequences may be extracted from the received light signals.

Having access to the intermediate sequences, the processing unit 430 may be configured to correlate a sequence of pixels of the acquired series of images corresponding to a selected physical position within the scene with each of the intermediate sequences. A note should be made here that, in an embodiment where the code 510 further includes intermediate sequences of M bits included e.g. before or after each occurrence of the Sequence 1, the number of images acquired by the camera 410 would be at least (4+M) images, instead of just 4 images (because N=4), as described above. In an embodiment where the code 510 further includes intermediate sequences of M bits included e.g. before or after each second occurrence of the Sequence 1, the number of images acquired by the camera 410 would be at least (2*N+M) images. Persons skilled in the art could figure out similar variations in the minimum number of images necessary to acquire with the camera 410 in order to resolve all of the bits of the embedded code. In such embodiments with the intermediate sequence, the sequence of pixels of the acquired series of images would be different than the sequence 810 illustrated in FIG. 8 because the sequence would then contain more than 4 values. Specifically, it would contain one value from each acquired image: for example, (4+M) values for the first embodiment described above and (8+M) for the second embodiment described above. Similarly, the frame time of the camera 410 would then be set to be appropriate for acquiring the minimum number of different images—the frame time could e.g. be set to $(4+1+M)*T_{bit}$ for the first embodiment described above and $(8+1+M)*T_{bit}$ for the second embodiment described above.

As a result of the correlation of the sequence of pixels of the acquired series of images corresponding to the selected physical position within the scene with the intermediate sequence embedded into the light output of the first light source (referred to herein as "the first intermediate sequence"), a correlation output having at least one peak is generated. A correlation output typically includes a number of "peaks," where some peaks are smaller than the others and represent artifacts of the correlation process. Such small peaks are referred to herein as "subpeaks" and the term "peak" is used herein to describe a peak in a correlation output that indicate presence of the particular intermediate sequence within the sequence of pixels of the acquired series of images corresponding to the selected physical position within the scene. This peak would be clearly higher than the subpeaks in the correlation output and a person skilled in the art could easily identify such a peak. Therefore, based on the correlation of the sequence of pixels of the acquired series of images corresponding to the selected physical position within the scene with the first intermediate sequence, the processing unit 430 is able to determine that the light contribution of the first light source is present at the selected physical position within the scene if the correlation output includes a peak. A similar correlation may be performed for any other selected physical position within the scene by correlating a sequence of pixels from the acquired images corresponding to the selected position within the scene with the first intermediate sequence.

On the other hand, as a result of the correlation of the sequence of pixels of the acquired series of images corresponding to the selected physical position within the scene with the intermediate sequence embedded into the light output of the first light source (referred to herein as "the second intermediate sequence"), a correlation output with no peaks is generated because, as shown in e.g. FIG. 6a, the second light source does not provide any, or at least negligible, light contribution to the pixel (4,5). Thus, the processing unit 430 may determine that a sequence of pixels (4,5) from the acquired series of images includes only, or dominantly, the light output of a single (first) light source.

If, for example, the processing unit 430 began with determining whether e.g. the sequence of pixels (7,6) within the series of acquired images includes only the light output of a single (first) light source by correlating the sequence of pixels (7,6) with each of the first and second intermediate sequences, then both of the correlation outputs would include a peak. A peak in each of these correlation outputs would indicate the presence of the light output of both light sources in the physical position within the scene corresponding to pixel (7,6). The processing unit 430 would then proceed to analyze another sequence of pixels until at least one sequence of pixels of the acquired series of images would be found that comprises the light output of only the first light source.

For such an embodiment of determining that a sequence of pixels corresponding to a particular physical position within the scene includes only the light output of a single (first) light source, the intermediate sequences may comprise sequences that have good autocorrelation properties. When used in a system where every light source is assigned a unique intermediate sequence, these sequences are, preferably, orthogonal. Examples of this would be the Walsh-Hadamard sequences, where the length of the intermediate sequence equals the number of light sources to be assigned an intermediate sequence. These sequences, however, typically requires synchronous operation, which is not always desired due to additional complexity. Therefore, another desirable property of the intermediate sequences is to have good cross-correlation properties, i.e. a high autocorrelation and low cross-correlation between the sequences. Examples of such sequences include pseudo-random sequences, sequences generated by linear feedback shift registers, or other sequences that might be used for code division multiple access communication systems.

In yet another embodiment all light sources are assigned unique switching frequencies, which serve as identification code. Also these yield low cross-correlation and high auto-correlation.

Persons skilled in the art will recognize that, for all of the scenarios described herein, other methods for processing the series of images to determine whether the light contribution of a particular light source is present at the selected physical position within the scene may be carried out by the processing unit 430. For example, the processing unit 430 may generate various sequences of pixels, for example corresponding to different intermediate sequences, and determine which one of these sequences matches with the sequence of pixels of the acquired series of images corresponding to the selected physical position, which can be done e.g. with a maximum likelihood search. Other methods may be envisioned as well.

In another embodiment, the determination that a sequence of pixels corresponding to a particular physical position within the scene includes primarily includes the light output of a single (first) light source may be done using a CRC embedded in the sequence of bit and it is used to determine whether the sequence of pixels comprises only, or primarily, light contributions of the first light source. To determine this, the process of FIG. 7 might be applied, as described further. The CRC is then used to verify whether the data is detected correctly. This is likely not the case when the light contribution of the first light source is too weak, when no light contribution of the first light source is present in that pixel, or when there are strong light contributions from multiple light sources are present at that pixel.

During the determination whether sequences of pixels corresponding to various particular physical positions within the scene include only, or dominantly, the light output of the first light source, it may be likely that the same data stream (corresponding to a light output of the first light source) is detected at multiple pixels. In one embodiment, the signals from these pixels might be combined during the subsequent determination of the individual bits of data embedded into the light output of the first light source. Alternatively, a selection of only few of the pixels yielding successful detection in the first packet of data embedded into the light output of the first light source might be used for the detection of the following packets. Pixels that do not include only the light output of the first light source may be ignored in the following steps.

In yet another embodiment, where different light sources generate light output of different wavelengths, the detection system 400 may ensure that a sequence of pixels corresponding to a particular physical position within the scene includes only the light output of a single (first) light source by using a color filter adapted to only pass the light of a particular wavelength (or a range of wavelengths) when acquiring the series of images.

The method may then proceed to an optional step 720, where the processing unit 430 may synchronize the detection system 400 to the first repeating sequence (i.e., the processing unit 430 may determine where the first repeating sequence begins).

In such an embodiment, the intermediate sequence may include a synchronization sequence, where the processing unit 430 has access to the synchronization sequence. The access to the synchronization sequence may be arranged in the same manner as the access to the intermediate sequence, described above.

Having the access to the synchronization sequence, the processing unit 430 may be configured to correlate at least one selected sequence of pixels within the series of images 600-1 through 600-4 corresponding to a physical position within the scene that includes only the light output of the first light source with the synchronization sequence. The maximum in the correlation output then relates to the beginning of the synchronization sequence and is used to determine the beginning(s) of (at least some of) the first repeating sequence(s) of the code 510. Sequences practically useful for synchronization are sequences with good autocorrelation properties, such as Barker sequences, which have a high correlation for full alignment but low correlation for a displaced version.

The method 700 then proceeds to step 730, where the processing unit 430 determines a type of modulation used to embed the first sequence of N bits in the light output of the first light source. In one embodiment, this can be done by using the intermediate sequence again. A field, typically consisting of a few bits, within the intermediate sequence could indicate which modulation was used to embed the first sequence of N bits into the light output of the first light source. To this end, the processing unit 430 also needs an access to the type of modulation used for the intermediate sequence. The type of modulation used for the intermediate sequence may be identified by e.g. including a certain identifier into the intermediate data and provided to the processing unit 430 as previously described for the identifiers of different light sources or for synchronization sequences of the light sources.

Alternatively, the modulation of the intermediate sequence and/or the first sequence of N bits might always be performed with a fixed modulation format. The step 730 is then reduced to the processing unit 430 obtaining the fixed modulation format by e.g. reading out the fixed modulation format from the memory 440 or receiving the fixed modulation format from the system 200.

In yet another embodiment, the processing unit 430 may learn the modulation method used to embed the first sequence of N bits in the light output of the first light source from the selected sequence of pixels within the series of images 600-1 through 600-4 corresponding to a physical position within the scene that includes only the light output of the first light source (e.g., the sequence 810). For example, the processing unit 430 may determine the number of levels in an amplitude modulation as the number equal to the number of amplitude levels in the sequence 810.

Once the type of modulation used to embed the first sequence of N bits in the light output of the first light source is known, in step 740, the processing unit 430 is configured to determine one or more thresholds differentiating different bits of the first sequence of N bits. In other words, the processing unit 430 determines the alphabet of modulation. For example, for a binary amplitude modulation, an intensity in a particular pixel of the sequence 810 that is above a certain level (i.e., a threshold) may be considered as representative of data bit "1" embedded into the light output of the first light source, while an intensity in the particular pixel of the sequence 810 that is below that certain level may be considered as representative of data bit "0" embedded into the light output of the first light source. Similarly, in multi-level amplitude modulation, multiple thresholds may be determined. A person skilled in the art could envision various methods of how the processing unit 430 may determine the thresholds depending e.g. correlation value of the intermediate sequence, the amplitude of the received sequence of pixels, and/or a distribution of the received intensity levels.

The method 700 may then proceed to step 750, where the processing unit 430 determines the first sequence of N bits by comparing each pixel of the sequence 810 with at least one of the determined thresholds (i.e., by using the alphabet of modulation obtained in step 740).

Optionally, following step 750, in an embodiment where the data embedded into the light output of the first light source is embedded in multiple packets, the data bits determined in step 750 may be aggregates into a single data packet. Steps 710-750 may then be repeated for the second data packet embedded into the light output of the first light source, and so on. Once data bits of all of the data packets are determined, the data bits may be re-combined to form the original data.

Similar processing of the acquired series of images 600-1 through 600-4 may be performed to determine the repeating sequence of bits embedded into the light output of the second light source.

Even though the current scenario considered the frame time of the camera to be equal to $5*T_{bit}$, in other embodiments, the frame time of the camera may be set to be equal to any integer multiple of $T_{bit}$, as long as the frame time is not an integer multiple or an integer fraction of the code period (in which case each image would contain the values of the same code bit). For example, if the code period is equal to $7*T_{bit}$, the frame time of the camera may be set to be two bits greater or two bits less than the code period, i.e. $9*T_{bit}$ or $5*T$. Further, the camera 410 may be configured to acquire an image during any time period $T_{bit}$ of each frame, not necessarily during the first time period $T_{bit}$ of each frame.

In one embodiment, the exposure instances may substantially coincide with the entire bits of the embedded data (i.e., that each exposure instance starts substantially when the new code bit is applied to modulate the drive signal applied to the light source and ends when the application of the new code bit ends). In other embodiments, the exposure instances may coincide not with the entire bits but with carefully chosen parts of the entire bits of the embedded data (e.g., with the middle 50% of the bits).

Further, in other embodiments dealing with the repeating sequence of N bits, more than N images may be acquired and processed by the processing unit 430. This can be done e.g. in an embodiment where the signal 520 includes an intermediate sequence of M bits. In such an embodiment, the minimum amount of images acquired and processed by the processing unit 430 is (N+M) images. In another embodiment, this can be used to improve the probability of detection of the light sources and to improve the detection of the data bits embedded into the light output of the light sources. For example, when 2N images are acquired, one can average over the 2 sets of N images to further suppress the influence of noise on the detection. This is specifically advantageous in low-light conditions, since in the proposed methods the exposure instants are typically small compared to exposure period.

Scenario 2: Multiple-Bit Exposure(s) Per Frame

Next, similar to the first scenario, consider that the illumination system 200 is such that two light sources can provide light contribution to a particular scene, where the scene is a part of the floor of the structure 100, illustrated in FIG. 1, the first light source is the one of the light sources 120 illustrated in FIG. 1 having the footprint 125b within the scene (i.e., on the floor), and the second light source is the one of the light sources 120 illustrated in FIG. 1 having the footprint 125c within the scene. Again, the respective codes embedded into the light outputs of the two light sources include different repeating sequences of N bits.

Figure 9:
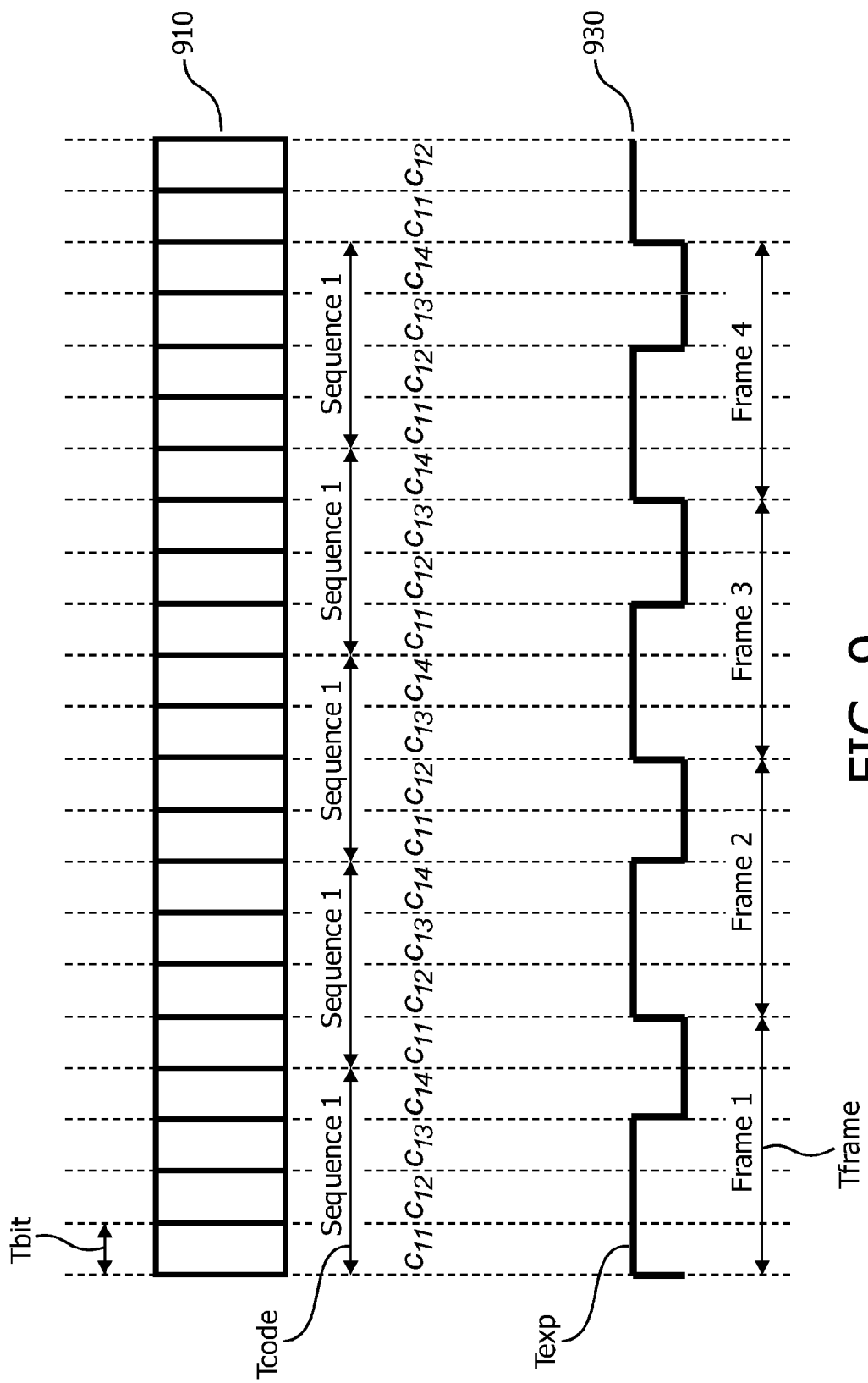
FIG. 9 provides schematic illustrations of an exemplary code comprising a repeating sequence of 4 symbols and exemplary multiple-bit exposure instances within the frames of the camera appropriate for such code, according to one embodiment of the present invention.

Again, consider that the repeating sequence of the code embedded into the light output of the first light source includes 4 bits, $c_{11}$, $c_{12}$, $c_{13}$, $c_{14}$, and that the repeating sequence of the code embedded into the light output of the second light source includes 4 bits, $c_{21}$, $c_{22}$, $c_{23}$, $c_{24}$. Again, each of the bits has duration $T_{bit}$ and the code period is, therefore, equal to $4*T_{bit}$. A code embedded into the light output of the first light source is shown in FIG. 9 as a code 910 and may be included in the signal 245, described in FIG. 2.

Discussion of the first scenario regarding how the bits of the code may be embedded into the light output of the light source are applicable here and, therefore, in the interests of brevity, are not repeated here. However, for simplicity, since the determination of the repeating sequence of N bits is performed for each light source independently of the other light source and since the processing unit 430 begins with selecting pixels of the acquired series of images where essentially only the light output of a single light source is present, the current scenario will now focus on an example where only a single light source provides light contribution to the scene. Of course, persons skilled in the art will recognize that the illustrative example shown here can easily be extended to multiple light sources by incorporating the teachings of the first scenario regarding how a sequence of pixels of the acquired images that includes only the light output of a single (the first) light source is selected (step 710 of the method 700 described above).

Again, the camera 410 is configured to acquire a series of images of the scene. To that end, the exposure of the camera may be set to comprise multiple exposure instances, each exposure instance having duration equal to the duration of one bit of the code period, i.e. $T_{bit}$. In this case, the total exposure time of the camera 410, $T_{exp}$, is the sum of durations of all of the multiple exposure instances. In such a scenario, in order to determine a repeating first sequence of N symbols included in the code 910, the detection system 400 may be configured to operate in a manner different from that described in the first scenario.

First, consider that the multiple exposure instances are consecutive and that the camera 410 is configured to acquire an image during the first time period $T_{exp}$ of each frame. The exposure of the camera 410 configured in this manner with three exposure instances in each frame is illustrated in FIG. 9 with a line 930.

When an image is taken, the camera acquires intensities of the total light output of the illumination system at all of the positions within a scene. In the illustrative example of the current scenario, the total light output of the illumination system comprises only the light contribution from the first light source.

Because the exposure time of the camera is set to be equal to a three consecutive code bits of the code 910, the intensity at a particular pixel of an image is affected by the values of all of the bits of the code encoded into the light output of the light source 220-1 at the time the image is taken. Each pixel represents an intensity of the total light output of the illumination system at a different physical position within the scene. Because the first image is taken when the light output of the first light source is modulated with code bits $c_{11}$, $c_{12}$, and $c_{13}$ (see, in FIG. 9, how camera exposure of Frame 1 of the exposure 930 overlaps with the code 910), the intensity $d_{x,y(1)}$ at each pixel (x,y) may be determined as follows:

$$d_{x,y(1)} = A_{x,y} \cdot c_{11} \cdot A_{x,y} \cdot c_{12} + A_{x,y} \cdot c_{13}, \quad (1)$$

where $A_{x,y}$ is a value of what the intensity would be if the drive signal applied to the first light source was not modulated with the code bits $c_{11}$, $c_{12}$, and $c_{13}$, and subscript (1) in $d_{x,y(1)}$ indicates that this is the intensity obtained at Frame 1.

As seen from the exposure 930, the second image of the series of images of the scene is acquired during Frame 2 of the camera 410. Because the second image is taken when the light output of the light source 220-1 is modulated with the code bits $c_{12}$, $c_{13}$, and $c_{14}$ (see, in FIG. 5, how camera exposure of Frame 2 of the exposure 530 overlaps with the code 910), the intensity $d_{x,y(2)}$ at each pixel (x,y) may be determined as follows:

$$d_{x,y(2)} = A_{x,y} \cdot c_{12} + A_{x,y} \cdot c_{13} + A_{x,y} \cdot c_{14}. \quad (2)$$

Similarly, for the third image, the intensity $d_{x,y(3)}$ at each pixel (x,y) may be determined as:

$$d_{x,y(3)} = A_{x,y} \cdot c_{13} + A_{x,y} \cdot c_{14} + A_{x,y} \cdot c_{11}. \quad (3)$$

Finally, for the fourth image, the intensity $d_4$ at each pixel (x,y) may be determined as:

$$d_{x,y(4)} = A_{x,y} \cdot c_{14} + A_{x,y} \cdot c_{11} + A_{x,y} \cdot c_{12}. \quad (4)$$

The above intensities (1)-(4) for a particular pixel (x,y) for the four acquired images may be written as a matrix intensity $\underline{d_{x,y}}$:

$$\underline{d_{x,y}} = \begin{bmatrix} d_1 \\ d_2 \\ d_3 \\ d_4 \end{bmatrix} = A_{x,y} \begin{bmatrix} 1 & 1 & 1 & 0 \\ 0 & 1 & 1 & 1 \\ 1 & 0 & 1 & 1 \\ 1 & 1 & 0 & 1 \end{bmatrix} \begin{bmatrix} c_{11} \\ c_{12} \\ c_{13} \\ c_{14} \end{bmatrix}, \quad (5)$$

Using notation that $$\underline{H} = \begin{bmatrix} 1 & 1 & 1 & 0 \\ 0 & 1 & 1 & 1 \\ 1 & 0 & 1 & 1 \\ 1 & 1 & 0 & 1 \end{bmatrix},$$

and $$\underline{c} = \begin{bmatrix} c_{11} \\ c_{12} \\ c_{13} \\ c_{14} \end{bmatrix},$$

formula (5) may be re-written as:

$$\underline{d_{x,y}} = A_{x,y} \underline{H} \cdot \underline{c} \quad (6)$$

In formula (6), the processing unit 430 possesses the intensity $\underline{d_{x,y}}$ from the acquired series of images, and $\underline{H}$—from the way the camera 410 and the shutter 420 are configured to take the images. Thus, equation (6) is an equation with one unknown, i.e. $A_{x,y} \underline{c}$. Written, again, in the matrix notation, the processing unit 430 may determine the unknown $A_{x,y} \underline{c}$ as:

$$A_{x,y} \underline{c} = \underline{H}^{-1} \cdot \underline{d} \quad (7)$$

where, according to the common matrix notation, $\underline{H}^{-1}$ denotes an inverse of the matrix $\underline{H}$, or pseudo-inverse for non-square matrix $\underline{H}$. Performing the calculation according to formula (7) can be considered applying a transformation that accounts for having multiple-bit exposure instances within each frame time of the camera to received sequence of intensities $\underline{d_{x,y}}$. This transformation corrects for the multiple-bit exposures per frame, resulting in the sequence of pixels (x,y) of the acquired images containing data in the form of $A_{x,y} \underline{c}$ (similar to the sequence 810 described in the first scenario), rather than data in the form of $A_{x,y} \underline{H} \cdot \underline{c}$ (i.e., uncorrected for the multiple-bit exposures per frame). Then a similar processing as was described in the first scenario (method 700) may then be applied to $A_{x,y} \underline{c}$. In various embodiments, the transformation is applied to the sequence of pixels prior to some or all of the steps 710-750, described above.

While the discussions of this scenario so far dealt with the case of the multiple exposure instances within a frame time of the camera 410 being consecutive, analogous approach would apply to multiple exposure instances that are non-consecutive. Equations (6) and (7) would still hold, whereas the difference in selecting different exposure instances for acquiring the images would be reflected in a different matrix $\underline{H}$. Since performing a calculation according to equation (7) requires determining an inverse of the matrix $\underline{H}$, multiple exposure instances for the series of images should be selected in such a manner so that the matrix $\underline{H}$ is invertible.

One further difference between acquiring images with multiple consecutive and multiple non-consecutive bits within the frame time of the camera 410 is in how such exposures can be implemented. Since the shutter 420 that is internal to all cameras may only open and close a single time within the frame, such a shutter may typically only be used to acquire images with multiple consecutive bits within the frame time of the camera 410.

Figure 10:
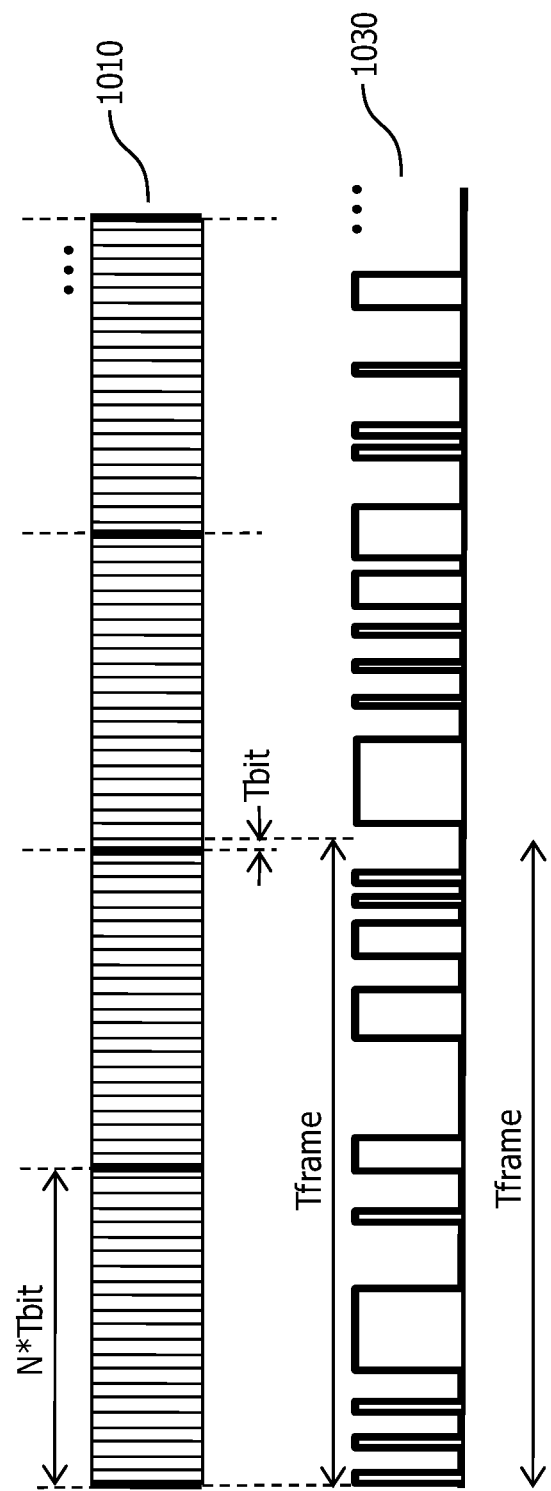
FIG. 10 provides schematic illustrations of an exemplary code comprising a repeating sequence of N symbols and exemplary switching signal used to operate a shutter external to the camera, according to one embodiment of the present invention.

On the contrary, the shutter 420 that is external to the camera 410 may be used to acquire images with both multiple consecutive and multiple non-consecutive bits within each frame. Such a shutter may be implemented as an electronic shutter disposed in front of the camera, which enables multiple open/closures of the shutter during a single frame. In one embodiment, such a shutter may be switched by a digital code. One example of the open/closure patterns enabled by the use of the shutter external to the camera 410 is illustrated as a switching signal 1030 in FIG. 10. FIG. 10 also illustrates an exemplary code 1010.

In one embodiment, the detection system 400 would then operate as follows. The combined light signal falls on the shutter 420, which is placed in front of the camera 410. The shutter 420 is operated by the switching signal 1030, which determines the open/close state of the shutter. Consider that the switching frequency of the shutter 420 is the same as that of the coded light, i.e. both use the same $T_{bit}$. The camera 410 will then integrate the incoming light over the frame time $T_{frame}$ (which also holds for all of the other embodiments described herein). By switching the shutter 420, the bits of the code 1010 during the open shutter times will be received and the others not. The resulting output signal from the shutter 420 to the camera 410 will thus be the sum over the bits during which the shutter was open.

For every frame, a different shutter code of length $T_{frame}$, where $T_{frame} = T_{bit} * N_{shut}$, is applied. In an embodiment where the shutter 420 is implemented as a shutter external to the camera 410, $N_{shut}$ is preferably an integer multiple or an integer fraction of $N_{code}$. In an embodiment where the shutter 420 is implemented as a shutter internal to the camera 410, $N_{shut}$ is preferably not equal to an integer multiple or an integer fraction of $N_{code}$. By selecting a correct set of consecutive codes to include in the switching signal 1030, i.e. such that the code matrix, $\underline{H}$, is invertible, the signal d(t) can be recovered after electrical processing of the signals output of the camera 410. The processing unit 430 may then proceed determining the sequence of N samples in the manner described above.

In one embodiment, the switching signal 1030 preferably contains as much 1's as possible, since the longer the shutter 420 is open, the more light is received by the sensor of the camera 410. Suitable codes for this purpose are S-matrices, which consists of the Hadamard matrices, after removing of the first row and column.

All of the discussions of the first scenario are applicable here and, therefore, are not repeated, except for the one regarding the duration of the frame time relative to that of the code period. In the scenario where each image is acquired with multiple exposure instances and the shutter 420 is implemented as a shutter external to the camera 410, the frame time of the camera is preferably set to be an integer multiple or an integer fraction of the code period. For example, if the code period is equal to $7*T_{bit}$, the frame time of the camera may be set to be twice the code period, i.e. $14*T_{bit}$. In the scenario where each image is acquired with multiple exposure instances and the shutter 420 is implemented as a shutter internal to the camera 410, the frame time of the camera is preferably set to be not equal to an integer multiple or an integer fraction of the code period, as illustrated in the first scenario.

One advantage of the current scenario is that acquiring each image with multiple-bit exposures per frame is more light efficient, especially in low light conditions. Therefore, the impact of noise on the detection process may be reduced.

One advantage of the present invention is that, based on the series of images acquired by choosing specific open/closure patterns of the shutter of a camera, coded light modulated at high frequency and, thus, invisible to the human eye, may be detected using a conventional low-rate camera. For example, a conventional 50 Hz camera may be used to determine coded light modulated at 1 kHz or higher, which is far above the human visibility threshold.

While example embodiment illustrated herein are provided for synchronous illumination systems (i.e., the systems where the embedded codes of various light sources begin at the same time), persons skilled in the art will be able to extend the teachings of the present invention to asynchronous illumination systems (i.e., the systems where the embedded codes of various light sources begin at different times).

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the forgoing is directed to embodiments of the present invention, other and further embodiments of the invention may be devised without departing from the basic scope thereof. For example, aspects of the present invention may be implemented in hardware or software or in a combination of hardware and software. Further, while the embodiments are discussed in context of visible light communications, the present invention also applies to wavelengths ranges other than the visible range. Therefore, the scope of the present invention is determined by the claims that follow.

The invention claimed is:

1. A detection system for determining a repeating first sequence of N symbols included in a first code, wherein the first code is embedded into a light output of a first light source of an illumination system, the detection system comprising:
 a camera configured to acquire a series of images of a scene, wherein:
  each acquired image includes a plurality of pixels, each pixel representing an intensity of a total light output of the illumination system at a different physical position within the scene and the total light output of the illumination system comprises the light output of the first light source in at least one physical position within the scene,
  the series comprises at least N different images, and
  each image of the at least N different images is acquired with a total exposure time comprising one or more exposure instances at different temporal positions within the repeating first sequence of N symbols, wherein, for each image, the total exposure time is less than the frame time of the camera; and
 a processing unit configured to process the acquired series of images to determine the repeating first sequence of N symbols.

2. The detection system according to claim 1, wherein, to process the acquired series of images to determine the repeating first sequence of N symbols, the processing unit is configured to:
 determine a type of modulation used to embed the first code into the light output of the first light source,
 based on the determined type of modulation, determine one or more thresholds differentiating different symbols of the first code, and
 determine the repeating first sequence of N symbols by comparing each pixel of a sequence of pixels of the acquired series of images corresponding to the at least one physical position within the scene that comprises the light output of the first light source with at least one of the one or more determined thresholds.

3. The detection system according to claim 2, wherein the processing unit is further configured to determine that the at least one physical position within the scene that comprises the light output of the first light source comprises only the light output of the first light source.

4. The detection system according to claim 2, wherein at least one first sequence of N symbols is separated from another first sequence of N symbols by an intermediate sequence of symbols.

5. The detection system according to claim 4, wherein, to process the acquired series of images to determine the repeating first sequence of N symbols, the processing unit is further configured to:
 correlate the sequence of pixels of the acquired series of images corresponding to the at least one physical position within the scene that comprises the light output of the first light source with the intermediate sequence of symbols, and
 based on the correlation, determine the beginning of the at least one first sequence of N symbols, determine the beginning of the another first sequence of N symbols, and/or determine that the at least one physical position within the scene that comprises the light output of the first light source comprises only the light output of the first light source.

6. The detection system according to claim 4, wherein the intermediate sequence of symbols is indicative of the type of modulation used to embed the first code into the light output of the first light source.

7. The detection system according to claim 4, wherein the duration of each of the one or more exposure instances is equal to the duration of one symbol of the first sequence of N symbols.

8. The detection system according to claim 4, wherein the one or more exposure instances comprise a single exposure of two or more consecutive exposure instances.

9. The detection system according to claim 8, wherein the processing unit is further configured to apply a transformation accounting for having more than one exposure instances within the total exposure time to the sequence of pixels of the acquired series of images corresponding to the at least one physical position within the scene that comprises the light output of the first light source.

10. The detection system according to claim 8, wherein a frame rate of the camera is lower than a frequency of modulation used to embed the first code into the light output of the first light source.

11. The detection system according to claim 4, wherein the one or more exposure instances comprise two or more non-consecutive exposure instances.

12. A method for determining a repeating first sequence of N symbols included in a first code, wherein the first code is embedded into a light output of a first light source of an illumination system, the method comprising:
- acquiring a series of images of a scene, wherein:
  - each acquired image includes a plurality of pixels, each pixel representing an intensity of a total light output of the illumination system at a different physical position within the scene and the total light output of the illumination system comprises the light output of the first light source in at least one physical position within the scene,
  - the series comprises at least N different images, and
  - each image of the at least N different images is acquired with a total exposure time comprising one or more exposure instances at different temporal positions within the repeating first sequence of N symbols, wherein, for each image, the total exposure time is less than the frame time of the camera; and
- processing the acquired series of images to determine the repeating first sequence of N symbols.

13. The method according to claim 12, wherein the processing of the acquired series of images to determine the repeating first sequence of N symbols comprises:
- determining a type of modulation used to embed the first code into the light output of the first light source,
- based on the determined type of modulation, determining one or more thresholds differentiating different symbols of the first code, and
- determining the repeating first sequence of N symbols by comparing each pixel of a sequence of pixels of the acquired series of images corresponding to the at least one physical position within the scene that comprises the light output of the first light source with at least one of the one or more determined thresholds.

14. The method according to claim 13, wherein the one or more exposure instances comprise two or more exposure instances and the processing of the acquired series of images to determine the repeating first sequence of N symbols further comprises applying a transformation accounting for having more than one exposure instances within the total exposure time to the sequence of pixels of the acquired series of images corresponding to the at least one physical position within the scene that comprises the light output of the first light source.

15. A non-transitory computer readable medium comprising a computer readable program for determining a repeating first sequence of N symbols included in a first code, wherein the first code is embedded into a light output of a first light source of an illumination system, wherein the computer readable program, when executed on a computer, causes the computer to perform the steps comprising:
- acquiring a series of images of a scene, wherein:
  - each acquired image includes a plurality of pixels, each pixel representing an intensity of a total light output of the illumination system at a different physical position within the scene and the total light output of the illumination system comprises the light output of the first light source in at least one physical position within the scene,
  - the series comprises at least N different images, and
  - each image of the at least N different images is acquired with a total exposure time comprising one or more exposure instances at different temporal positions within the repeating first sequence of N symbols, wherein, for each image, the total exposure time is less than the frame time of the camera; and
- processing the acquired series of images to determine the repeating first sequence of N symbols.

16. The non-transitory computer readable medium of claim 15, wherein the computer readable program further causes the computer to perform the steps comprising:
- determining a type of modulation used to embed the first code into the light output of the first light source;
- based on the determined type of modulation, determining one or more thresholds differentiating different symbols of the first code; and
- determining the repeating first sequence of N symbols by comparing each pixel of the sequence of pixels of the acquired series of images corresponding to the at least one physical position within the scene that comprises the light output of the first light source with at least one of the one or more determined thresholds.

* * * * *